(12) United States Patent
Farber

(10) Patent No.: US 8,099,943 B2
(45) Date of Patent: Jan. 24, 2012

(54) EXHAUST DUCT WITH BYPASS CHANNEL

(75) Inventor: Steven Farber, Dollard-des-Ormeaux (CA)

(73) Assignee: Pratt & Whitney Canada Corp., Longueuil, QC (CA)

( * ) Notice: Subject to any disclaimer, the term of this patent is extended or adjusted under 35 U.S.C. 154(b) by 0 days.

(21) Appl. No.: 13/075,252

(22) Filed: Mar. 30, 2011

(65) Prior Publication Data
US 2011/0173987 A1 Jul. 21, 2011

Related U.S. Application Data

(62) Division of application No. 11/941,290, filed on Nov. 16, 2007, now Pat. No. 7,937,929.

(51) Int. Cl.
*F02C 7/08* (2006.01)
(52) U.S. Cl. ....................................................... 60/39.5
(58) Field of Classification Search ................... 60/39.5, 60/685, 694, 695, 697; 137/1; 138/39; 181/212, 181/227, 228
See application file for complete search history.

(56) References Cited

U.S. PATENT DOCUMENTS

| | | | | |
|---|---|---|---|---|
| 4,007,587 A * | 2/1977 | Banthin et al. | .................. | 60/204 |
| 6,253,540 B1 * | 7/2001 | Chew et al. | ...................... | 60/262 |
| 6,959,552 B2 * | 11/2005 | Leblanc | .......................... | 60/772 |
| 2002/0139120 A1 * | 10/2002 | Sheoran et al. | ................. | 60/772 |
| 2005/0205355 A1 * | 9/2005 | Lin | ............... | 181/279 |
| 2007/0028623 A1 * | 2/2007 | Steyer et al. | .................... | 60/772 |

* cited by examiner

*Primary Examiner* — Louis Casaregola
*Assistant Examiner* — Phutthiwat Wongwian
(74) *Attorney, Agent, or Firm* — Norton Rose Or LLP

(57) ABSTRACT

An exhaust duct for directing a stream of combustion gases in a gas turbine engine is provided. The exhaust duct comprises an inlet for receiving the stream of combustion gases from a turbine section of the gas turbine engine; an outlet in fluid communication with the inlet; and a transition portion defining a passage between the inlet and the outlet. The passage comprises a discontinuous annular region having a first side portion and a second side portion that are separated by a flow splitter. At least one bypass channel interconnects the first side portion and the second side portion of the discontinuous annular region.

10 Claims, 4 Drawing Sheets

EXHAUST DUCT WITH BYPASS CHANNEL

RELATED APPLICATION

This application is a divisional of U.S. patent application Ser. No. 11/941,290 filed on Nov. 16, 2007 now U.S. Pat. No. 7,937,929.

TECHNICAL FIELD

The invention relates generally to gas turbine engines and, more particularly, to redirecting a stream of combustion gases.

BACKGROUND OF THE ART

Combustion gases exiting a turbine section of a gas turbine engine are typically redirected and discharged outwardly from the engine using suitable exhaust ducting. It is desirable that such exhaust ducting be designed so as to minimize any pressure losses associated with exhausting the combustion gases. Such pressure losses can significantly reduce the performance of the gas turbine engine.

A stream of combustion gases exiting the turbine section often has a relatively complex flow field which can comprise a rotary or swirling component of motion. Such complex flow fields in the combustion gases can cause great challenges in designing suitable exhaust ducting, especially when the ducting must redirect the stream of combustion gases towards a direction that differs from the incoming direction. Complex flow fields in the combustion gases can create pressure differentials within the ducting which in turn can cause flow separation along the internal surfaces of the ducting. Flow separation increases the resistance imposed on the stream of combustion gases and also increases pressure losses associated with exhausting the combustion gases.

Accordingly, there is a need to provide improved exhaust ducting which can reduce pressure losses associated with exhausting combustion gasses.

SUMMARY

It is therefore an object to provide an exhaust duct which addresses the above mentioned concerns.

In one aspect, there is provided an exhaust duct for redirecting a stream of combustion gases in a gas turbine engine, the exhaust duct comprising: an inlet having an annular cross-section for receiving the stream of combustion gases from a turbine section of the gas turbine engine, the inlet having an inlet axis; an outlet in fluid communication with the inlet; a transition portion defining a passage between the inlet and the outlet, the passage following a course which deviates from the inlet axis, the passage comprising a discontinuous annular region having a first side portion and a second side portion that are separated by a flow splitter; and at least one bypass channel interconnecting the first side portion and the second side portion of the discontinuous annular region.

In a second aspect, there is provided exhaust duct for redirecting a stream of combustion gases in a gas turbine engine wherein the stream of combustion gases comprises a swirling motion, the exhaust duct comprising: means for receiving the stream of combustion gases from a turbine section of the gas turbine engine along an inlet axis; means for discharging the combustion gases in fluid communication with the means for receiving the stream of combustion gases; means for directing the combustion gases along a course which deviates from the inlet axis between the means for receiving and the means for discharging; means for splitting the stream of combustion gases so as to obstruct the swirling motion of the stream, the means for splitting the stream being disposed downstream from the means for receiving the stream; and means for reducing a pressure differential in the combustion gases across the means for splitting the stream.

In a third aspect, there is provided an exhaust duct for directing a stream of swirling combustion gases, the exhaust duct comprising: an inlet having an annular inlet cross-section for receiving the stream of combustion gases, the inlet having an inlet axis; an outlet in fluid communication with the inlet, the outlet having an outlet cross-section which differs from the inlet cross-section: a transition portion defining a passage between the inlet and the outlet, the passage having a cross-section that varies between the inlet and the outlet so as to gradually transitions the inlet annular cross-section to the outlet cross-section, the passage further comprising a discontinuous annular region having a first side portion and a second side portion that are separated by a flow splitter; and at least one bypass channel interconnecting the first side portion and the second side portion of the discontinuous annular region.

In a fourth aspect, there is provided a method of redirecting a stream of swirling combustion gases flowing through an exhaust duct of a gas turbine engine, the method comprising the steps of: a) receiving an annular stream of combustion gases from a turbine section into an annular inlet portion of a passage defined by the exhaust duct, the annular inlet portion having an inlet axis, the annular stream of combustion gases having a swirling motion about the inlet axis; b) splitting the stream of combustion gases so as to obstruct the swirling motion of the stream by providing a flow splitter at one circumferential location in the passage, the flow splitter dividing the passage into first and second annular side portions; c) reducing a pressure differential in the combustion gases in which the swirling motion has been obstructed by allowing the annular stream of combustion gases to flow from the first annular side portion to the second annular side portion via at least one bypass channel; and d) discharging the combustion gases from the exhaust duct.

Further details of these and other aspects of the present invention will be apparent from the detailed description and figures included below.

DESCRIPTION OF THE DRAWINGS

Reference is now made to the accompanying figures depicting aspects of the present invention, in which.

DETAILED DESCRIPTION OF THE PREFERRED EMBODIMENTS

Figure 1:
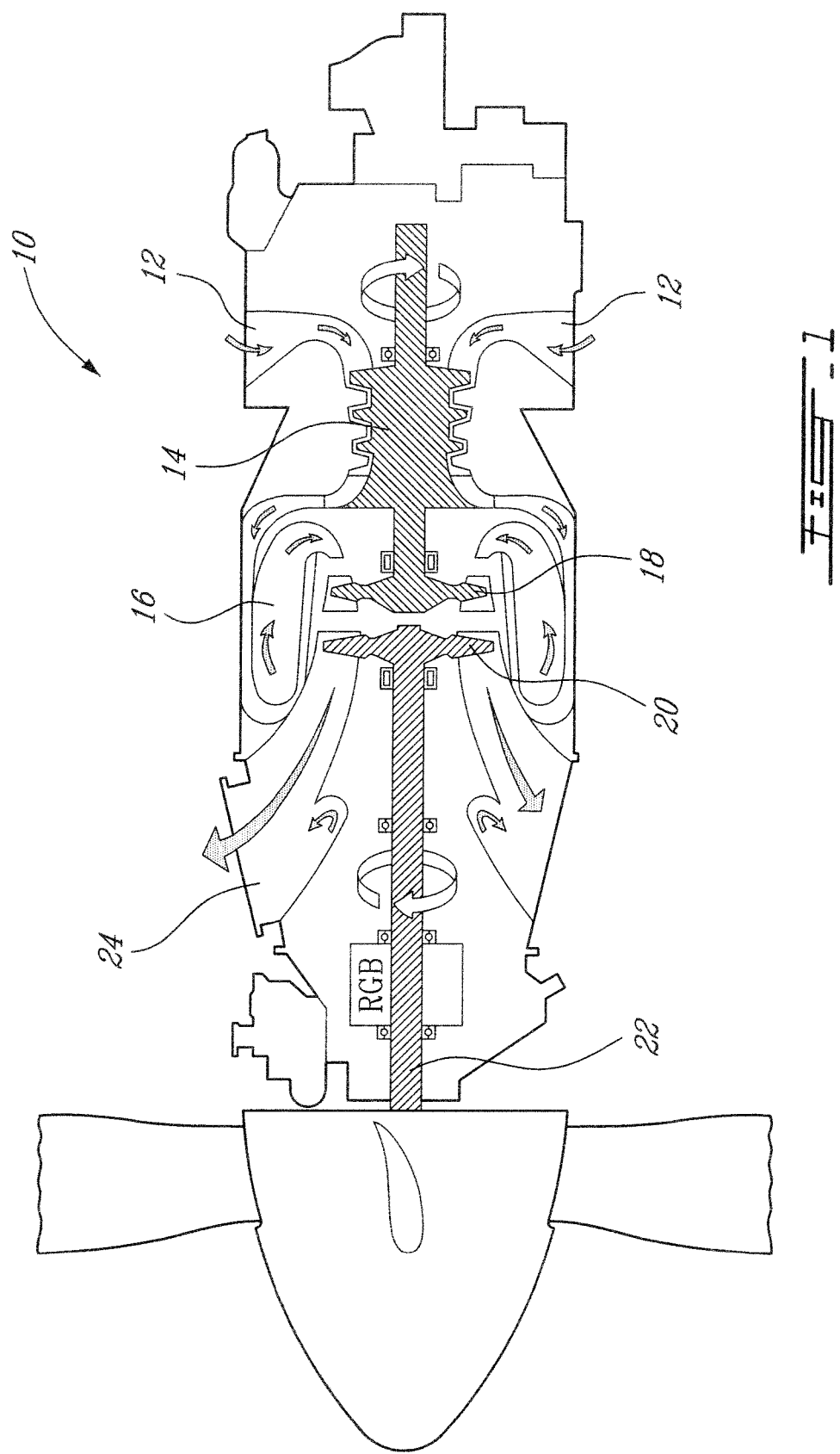
FIG. 1 is an axial cross-section view of a gas turbine engine.

FIG. 1 illustrates a turboprop engine 10 of a type preferably provided for use in subsonic flight, generally comprising in serial flow communication one or more air inlets 12 through which ambient air is drawn, a multistage compressor 14 for pressurizing the air, a combustor 16 in which the compressed air is mixed with fuel and ignited for generating an annular stream of hot combustion gases, a compressor turbine 18 and a turbine section 20 for extracting energy from the combustion gases. The turbine section 20 is coupled to an output shaft 22 to which a propeller may be secured. After passing through the turbine section 20, the annular stream of combustion gases is exhausted through an exhaust duct 24 which may be further connected to an exhaust stub (not shown).

Figure 2:
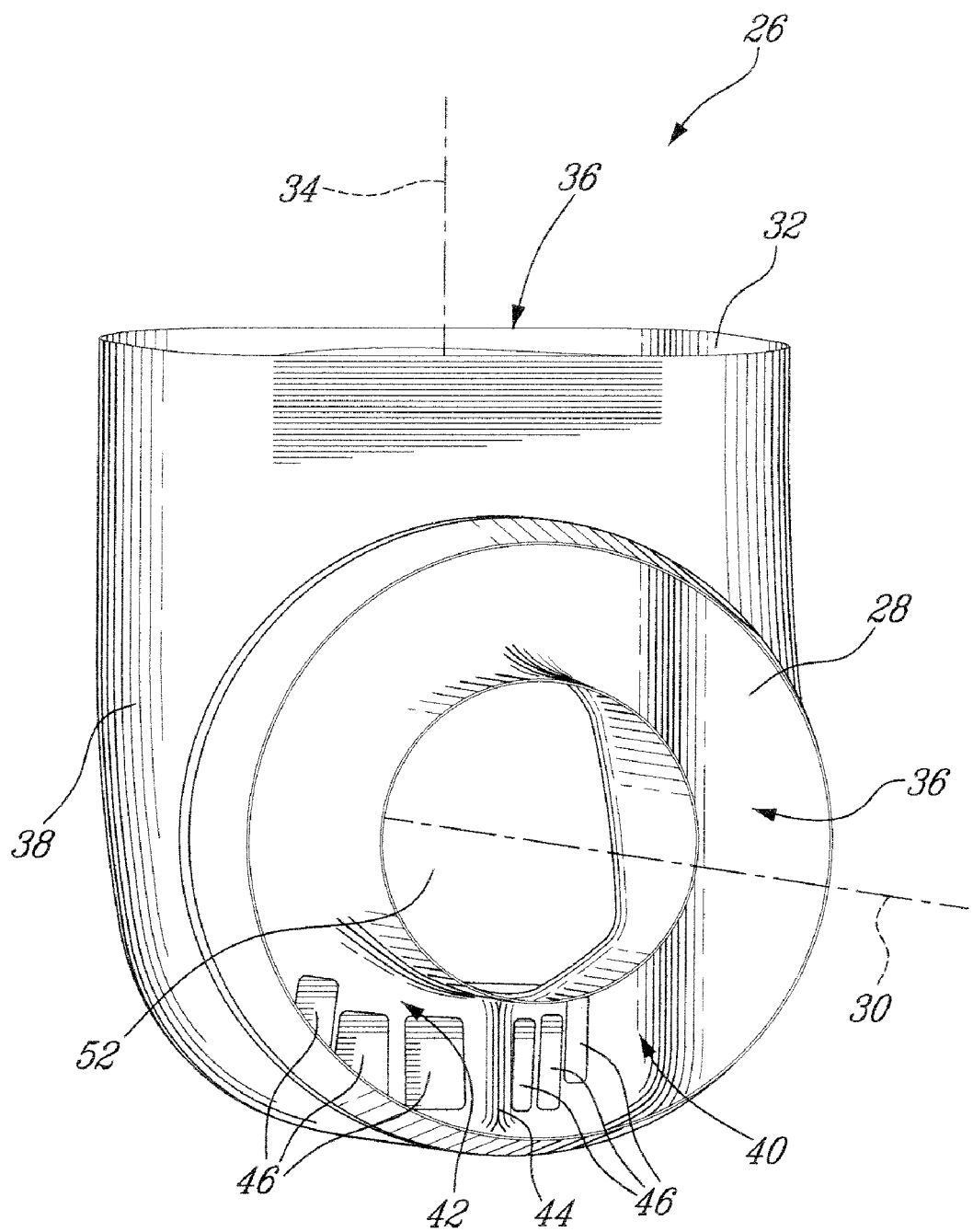
FIG. 2 is an isometric front view of an exhaust duct according to one embodiment of the present invention.

FIG. 2 shows an improved exhaust duct, generally shown at 26, which may be used to replace the exhaust duct 24 shown in FIG. 1 for redirecting a stream of combustion gases from an axial direction to a radial direction. The exhaust duct 26 comprises an inlet 28 having an inlet axis 30 and an outlet 32 having an outlet axis 34. The outlet axis 34 is divergent from the inlet axis 30. The inlet 28 has a substantially annular cross-section and the outlet 32 has a substantially rectangular cross-section. The inlet 28 and the outlet 32 are in fluid communication via a passage, generally shown at 36, which is defined by a transition portion 38 of the exhaust duct 26. The passage 36 between the inlet 28 and the outlet 32 follows a course which deviates from the inlet axis 30. The passage 36 also comprises a discontinuous annular region which has a first side portion (the right hand side in FIG. 2), generally shown at 40, and a second side portion (the left hand side in FIG. 2), generally shown at 42. The first side portion 40 and the second side portion 42 are separated by a centrally disposed flow splitter 44. The exhaust duct 26 further comprises at least one bypass channel 46 (three in the illustrated example) that interconnects the first side portion 40 and the second side portion 42.

Figure 3:
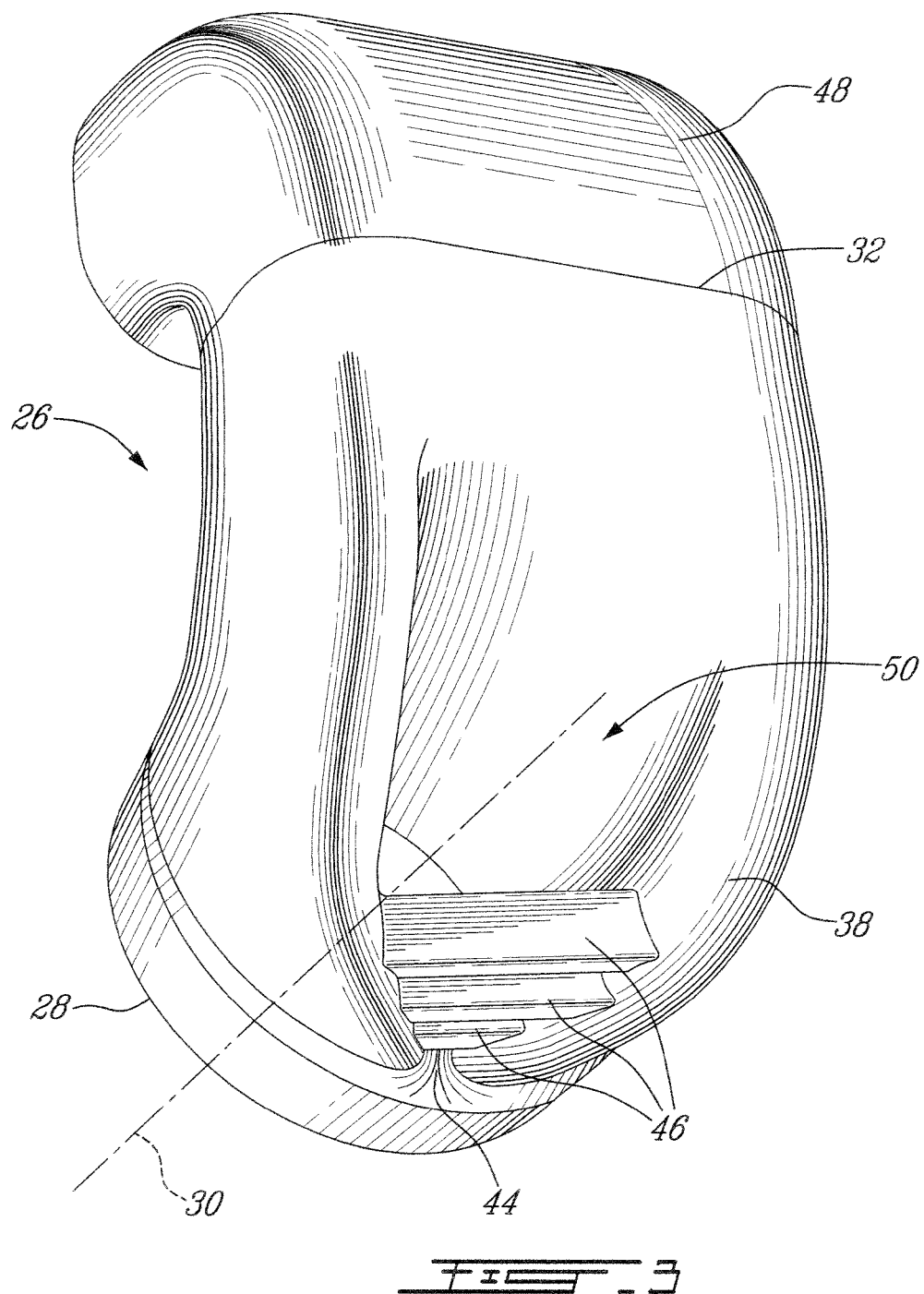
FIG. 3 is an isometric rear view of the exhaust duct of FIG. 2, connected to an exhaust stub.

FIG. 3 shows a rear side of the exhaust duct 26 wherein the exhaust duct 26 is connected to an exhaust stub 48. The exhaust stub 48 may have any suitable configuration that is specific to the application for which the gas turbine engine 10 is used. For example, the exhaust stub 48 may be used to direct the stream of combustion gases out of a nacelle (not shown) enclosing the gas turbine engine 10. The duct 26 may be connected to the exhaust stub and gas turbine engine 10 via any suitable means, including flanges or the like.

The passage 36 defines a bend from axial to radial and has a cross-section that varies between the inlet 28 and the outlet 32. The cross-section of the passage 36 defined by the transition portion 38 varies so as to surround a void, generally shown at 50, about the inlet axis 30. The void 50 is in communication with a central opening 52 of the annular cross-section of the inlet 28 shown in FIG. 2. The void 50 allows the coupling of the output shaft 22 to the turbine section 20 of the gas turbine engine 10. The cross-section of the passage 36 varies such that the first side portion 40 and the second side portion 42 of the discontinuous annular region are progressively separated from each other along the passage 36 from the flow splitter 44 towards the outlet 32. The cross-section of the passage 36 further varies so as to gradually transition the annular cross-section of the inlet 28 to the substantially rectangular cross-section of the outlet 32.

The flow splitter 44 is disposed adjacent to the inlet 28 but may also be disposed at the inlet 28 or at any distance downstream from the inlet 28. It is however preferable that the flow splitter 44 be disposed closer to the inlet 28 than the outlet 32 within the passage 36.

Figure 4:
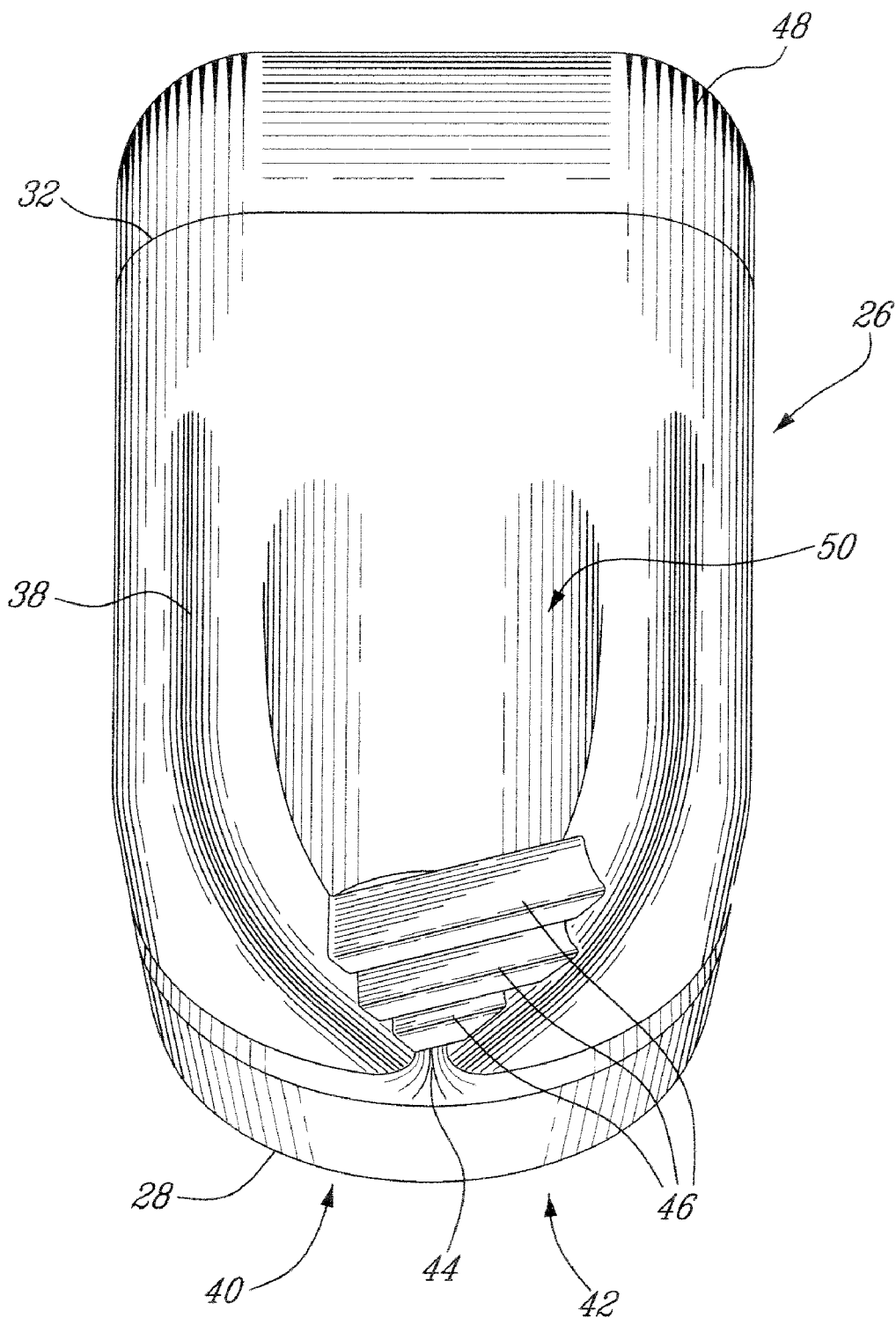
FIG. 4 is an isometric bottom view of the exhaust duct of FIG. 2.

FIG. 4 shows a bottom side of the exhaust duct 26 wherein the bypass channels 46 are shown to connect the first side portion 40 of the discontinuous annular region to the second side portion 42 of the discontinuous annular region. The bypass channels 46 are disposed at an orientation wherein the locations at which the bypass channels 46 are connected to the second side portion 42 are downstream from the corresponding locations at which the bypass channels 46 are connected to the first side portion 40. The bypass channels 46 may also be disposed in a substantially parallel arrangement as shown in FIG. 4.

During operation, the combustion gases are received through the inlet 28 and discharged through the outlet 32. The annular stream combustion gases exiting the turbine section 20 of the gas turbine engine 10 generally travels along the inlet axis 30 of the exhaust duct 26 but also comprises a swirling motion. The swirling motion comprises a rotary motion of the combustions gases about the inlet axis 30. The annular stream of combustion gases is received in the inlet 28 having a corresponding annular cross-section. As the combustion gases flow inwardly into the passage 36, the combustion gases encounter the flow splitter 44. The flow splitter 44 effectively interrupts or obstructs the swirling motion of the stream of combustion gases. Consequently, without any bypass channels 46, the interaction of the swirling motion of the combustion gases with the flow splitter 44 creates a pressure differential on surfaces of the passage 36 adjacent to and across the flow splitter 44. The pressure differential is created on the surfaces of the passage 36 between the first side portion 40 and the second side portion 42.

Specifically, the interaction of the flow splitter 44 and the swirling motion of the combustion gases creates a pressure surface in one of the first and second side portions 40 and 42, and, a suction surface in the other one of the first and second side portions 40 and 42. The respective location of the pressure surface and the suction surface depends on whether the swirling motion of the stream of combustion gases is clockwise or counter clockwise relative to the inlet 28. The flow splitter 44 has the effect of decelerating the flow of combustion gases in one of the first and second side portions 40 and 42 and making the other one of the first and second side portions 40 and 42 more favourable with a higher Mach number. Depending on the magnitude of the pressure along the suction surface and the characteristics of the flow field of the combustion gases, separation of flow may occur along the suction surface. The separation of flow along the suction surface consequently increases the resistance of redirecting the combustion gases through the exhaust duct 26. In turn, this increases flow resistance and energy losses associated with exhausting the combustion gases which affects the performance of the gas turbine engine 10.

The bypass channels 46 are used to reduce or minimize the pressure differential between the pressure surface and the suction surface. This reduces the likelihood of flow separation to occur on the suction surface and also causes the flow of combustion gases to be more uniformly distributed within the passage 36. The bypass channels 46 sequentially interconnect the first side portion 40 to the second side portion 42. During operation, any pressure differential between the first and second side portions 40 and 42 is eliminated or significantly reduced since a bypass flow of combustion gases through the bypass channels 46 is directed from the region of comparatively higher pressure to the region of comparatively lower pressure. The cross-sectional area of each bypass channel 46 and the number of bypass channels 46 needed for directing a suitable amount of bypass flow of combustion gases may be determined, for example, on the basis of conventional computational fluid dynamics (CFD) analyses conducted at the desired operation conditions of the gas turbine engine 10. The bypass channels 46 must also be designed in accordance with the specific geometric configuration of the exhaust duct 26. Accordingly, it is possible that either a single or a plurality of bypass channels 46 may be used depending on the specific application.

The bypass channels 46 are shown in FIG. 4 to be in a substantially parallel arrangement. Each bypass channel 46 is also oriented so that its connection to the second side portion 42 is located further downstream in relation to the flow splitter 44 than its connection to the first side portion 40. It must be noted that the opposite may be the case depending on the direction of the swirling motion of the incoming stream of combustion gases. This particular orientation of each bypass channels 46 is used to minimize the amount of resistance imposed on the combustion gases flowing through the bypass channels 46, A proper orientation of the bypass channels 46 will cause the obstruction of the swirling motion of the stream of combustion gases to be reduced. Again, a suitable orientation of the bypass channels 46 may be determined based on the geometry of the exhaust duct 26 and the flow characteristics of the stream of combustion gases. For example, conventional CDF methods could again be employed by a person skilled in the art to determine a specific arrangement of bypass channels 46 suitable for minimizing the likelihood of flow separation within the exhaust duct 26.

The configuration of the exhaust duct 26 shown in the figures shows an annular inlet cross-section and a substantially rectangular outlet cross-section. The passage 36 appropriately transitions the inlet cross-section to the outlet cross-section. It is evident that the specific configuration of the exhaust duct 26 is exemplary and that other configurations could also be used. For example. it is apparent that the outlet cross-section could have other profiles that are suitable for interfacing to other types of exhaust stubs. Further, the term rectangular is intended to encompass substantially rectangular contours which comprise rounded or filleted corners. For some applications, it may be desirable to have the exhaust duct 26 and the exhaust stub 48 integrally formed.

It is apparent that the exhaust duct 26 can be manufactured using conventional processes and suitable materials that are able to withstand the exposure to the elevated temperatures of the combustion gases. For example the exhaust duct 26 can be manufactured using sheet metal forming and joining techniques to form separate sheet metal sections that are subsequently joined together to form the complete exhaust duct 26.

The above description is meant to be exemplary only, and one skilled in the art will recognize that changes may be made to the embodiments described without departing from the scope of the invention disclosed. For example, even though the exhaust duct 26 is used to redirect combustion gases from the turbine section 20 of the gas turbine engine 10, it is apparent that such a duct could be used in other applications and that the combustion gases could be substituted with other fluids. Still other modifications which fall within the scope of the present invention will be apparent to those skilled in the art, in light of a review of this disclosure, and such modifications are intended to fall within the appended claims.

What is claimed is:

1. A method of redirecting a stream of swirling combustion gases flowing through an exhaust duct of a gas turbine engine, the method comprising the steps of:

a) receiving an annular stream of combustion gases from a turbine section into an annular inlet portion of a passage defined by the exhaust duct, the annular inlet portion having an inlet axis, the annular stream of combustion gases having a swirling motion about the inlet axis;
   b) splitting the stream of combustion gases so as to obstruct the swirling motion of the stream by providing a flow splitter at one circumferential location in the passage, the flow splitter dividing the passage into first and second annular side portions;
   c) reducing a pressure differential in the combustion gases in which the swirling motion has been obstructed by allowing the annular stream of combustion gases to flow from the first annular side portion to the second annular side portion via at least one bypass channel; and
   d) discharging the combustion gases from the exhaust duct.

2. The method defined in claim 1, wherein the step of reducing a pressure differential includes directing a bypass flow of combustion gases through the at least one bypass channel from a region of comparatively high pressure to a region of comparatively low pressure.

3. The method defined in claim 1, wherein allowing the annular stream of combustion gases to flow from the first annular side portion to the second annular side portion comprises discharging the combustion gases from the at least one bypass channel at a location downstream from an inlet of the at least one bypass channel relative to the flow splitter.

4. The method defined in claim 1, wherein allowing the annular stream of combustion gases to flow from the first annular side portion to the second annular side portion comprises providing discrete bypass flows of combustion gases from the first to the second annular side portions via a plurality of bypass channels sequentially interconnecting the first side portion of the passage to the second side portion thereof.

5. The method defined in claim 1, comprising transitioning the steam of combustion gases from an annular flow to a non-annular conduit flow along the passage of the exhaust duct.

6. The method defined in claim 1, wherein discharging comprises directing the combustion gases in a direction different from the inlet axis of the exhaust duct.

7. The method defined in claim 1, wherein the passage follows a course which deviates from the inlet axis.

8. The method defined in claim 1, progressively separating the annular stream of combustion gases into discrete flows between the first and second side regions of the passage.

9. The method defined in claim 1, comprising splitting the flow at a location adjacent to the inlet portion.

10. The method defined in claim 1, wherein splitting the stream of combustion gases comprises using the flow splitter to decelerate the flow along the first annular side portion of the passage while making the flow on the second annular side portion of the passage more favourable with a higher Mach number.

* * * * *